US009261999B2

(12) United States Patent
Jeong et al.

(10) Patent No.: US 9,261,999 B2

(45) Date of Patent: Feb. 16, 2016

(54) DISPLAY PANEL HAVING EMBEDDED LIGHT SENSORS

(75) Inventors: Ki-Hun Jeong, Cheonan-si (KR); Woongkwon Kim, Cheonan-si (KR); Yunjong Yeo, Seoul (KR); Sungryul Kim, Asan-si (KR); Byeonghoon Cho, Seoul (KR); HeeJoon Kim, Asan-si (KR); Daecheol Kim, Hwaseong-si (KR); Hong-Kee Chin, Suwon-si (KR); Jung suk Bang, Guri-si (KR); Kun-Wook Han, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 602 days.

(21) Appl. No.: 13/300,358

(22) Filed: Nov. 18, 2011

(65) Prior Publication Data

US 2012/0182277 A1 Jul. 19, 2012

(30) Foreign Application Priority Data

Jan. 17, 2011 (KR) ........................ 10-2011-0004629

(51) Int. Cl.
*G09G 3/36* (2006.01)
*G06F 3/041* (2006.01)

(52) U.S. Cl.
CPC .................................... *G06F 3/0412* (2013.01)

(58) Field of Classification Search
CPC ... G09G 3/3406; G09G 3/3413; G09G 3/342; G09G 3/3426; G09G 2300/08; G09G 2360/14; G09G 2360/142; G09G 2360/144
USPC ........................................... 345/102, 103, 87
See application file for complete search history.

(56) References Cited

U.S. PATENT DOCUMENTS

| | | | | |
|---|---|---|---|---|
| 7,218,048 | B2 * | 5/2007 | Choi et al. | 345/84 |
| 7,655,889 | B2 * | 2/2010 | Nakamura et al. | 345/77 |
| 2007/0290963 | A1 * | 12/2007 | Chen et al. | 345/87 |
| 2009/0135167 | A1 * | 5/2009 | Sakai et al. | 345/207 |
| 2010/0308345 | A1 * | 12/2010 | Brown et al. | 257/82 |

* cited by examiner

*Primary Examiner* — Waseem Moorad

(74) *Attorney, Agent, or Firm* — Innovation Counsel LLP

(57) ABSTRACT

A display panel includes a plurality of pixels disposed on a first panel substrate of first and second panel substrates that face each other and cooperate to display an image. The second panel substrate includes a base substrate, a read-out line, a first insulating layer, a scan line, a switching device, and a light sensor. The read-out line is disposed on the base substrate and extended in a direction. The first insulating layer is disposed on the read-out line. The scan line is extended to cross the read-out line and disposed on the first insulating layer. The switching device includes a first electrode connected to the scan line, a second electrode connected to a read-out line, and a third electrode spaced apart from the second electrode. The light sensor is structured to selectively detect lights of predetermined wavelengths and connected to the third electrode of the switching device.

20 Claims, 14 Drawing Sheets

DISPLAY PANEL HAVING EMBEDDED LIGHT SENSORS

CROSS-REFERENCE TO RELATED APPLICATION

This application relies for priority upon Korean Patent Application No. 10-2011-0004629 filed on Jan. 17, 2011, the contents of which are herein incorporated by reference in their entirety.

BACKGROUND

1. Field of Disclosure

The present disclosure of invention relates to a display panel capable of improving its sensibility against an external light.

2. Description of Related Technology

In recent times, display apparatuses having a touch-sensing capability have been widely used since such display apparatuses do not need to have a separate input devices, such as keyboards, mice, peripheral scanners, etc. for receiving touch-based user inputs.

In one class of touch-sensing display apparatuses, a light sensitive sensor is employed in determining location of user touches on the touch panel and the light sensitive sensor is integrally embedded in a layer provided on top of the display panel or in the display panel itself. The sensor disposed on or in the display panel senses an external touch action by using light provided from a backlight unit or provided from an exterior to output a sensing signal corresponding to user touch.

However, the sensing signal may be distorted by light signals generated by other elements of the display panel such as light emitting elements that output light in the visible light range. Additionally, the touch sensing signal may be distorted by electrical signals used to drive other elements of the display panel such as light emitting elements of the display panel.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

Exemplary embodiments in accordance with the present disclosure of invention provide a display panel capable of simultaneously sensing intensities of incident lights incident upon the display panel where the display panel includes a shielding structure that shields sensing signals used to indicate sensed intensities of the incident lights from being interfered with by other signals used to drive the image displaying function of the display panel.

According to an exemplary embodiment, a display panel includes a plurality of pixels disposed on a first substrate that is in spaced apart facing relation with a second substrate and the first and second substrates cooperate to display an image. The second substrate includes a base substrate, a read-out line, a first insulating layer, a scan line, a switching device, and a light sensor.

The read-out line is disposed on the base substrate and extended in a direction and the first insulating layer is disposed on the read-out line. The scan line is extended to cross the read-out line and disposed on the first insulating layer. The switching device includes a first electrode connected to the scan line, a second electrode connected to the read-out line, and a third electrode spaced apart from the second electrode. The light sensor is connected to the third electrode to sense an external light. A shielding electrode is provided to extend over and along the read-out line.

Other aspects of the disclosure will become apparent from the below detailed description.

BRIEF DESCRIPTION OF THE DRAWINGS

The above and other advantages of the present disclosure of invention will become readily apparent by reference to the following detailed description when considered in conjunction with the accompanying drawings wherein.

DETAILED DESCRIPTION

Figure 1:
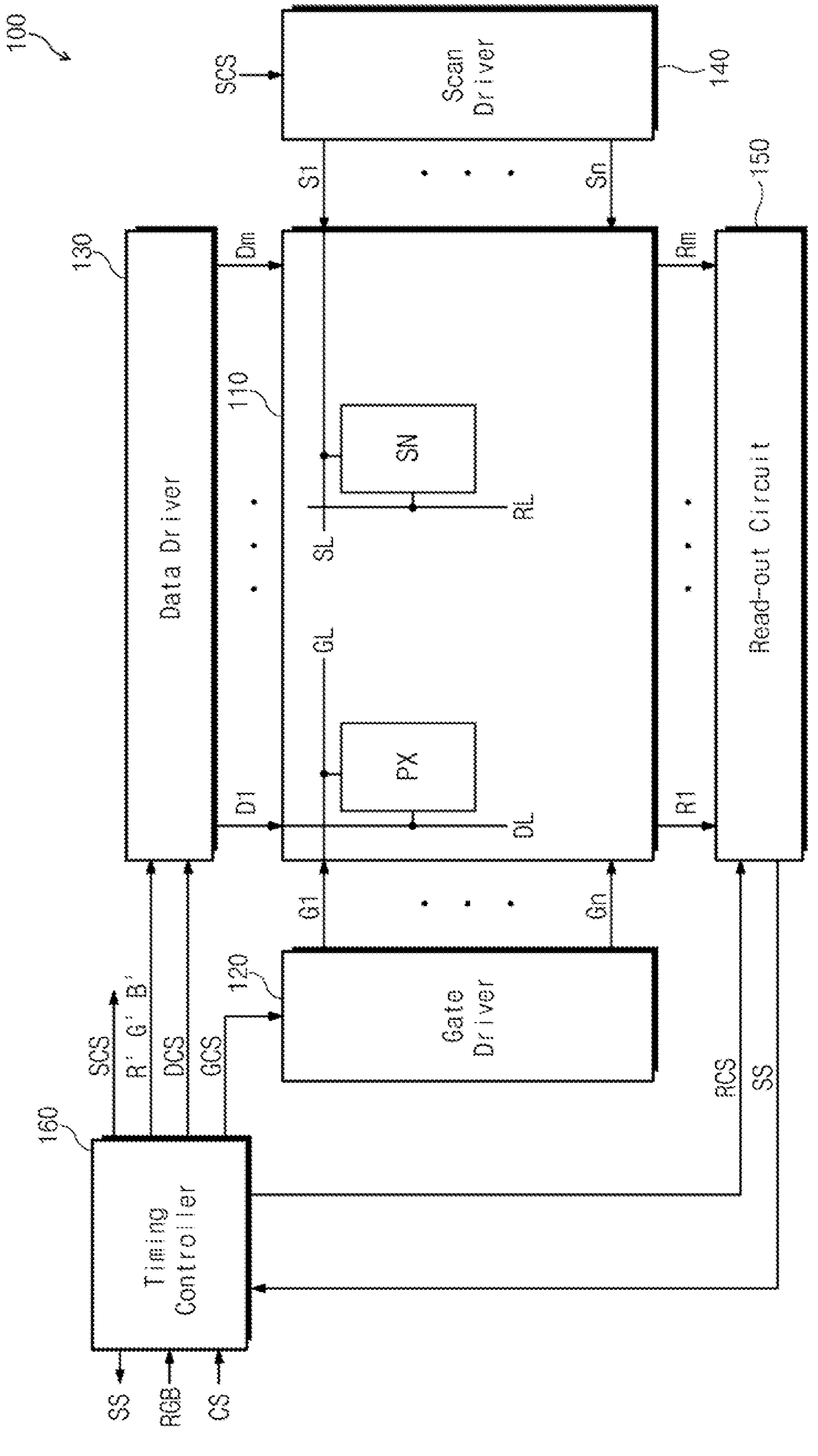
FIG. 1 is a block diagram showing a display apparatus according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the here disclosed subject matter. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention most closely pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be provided in greater detail with reference to the accompanying drawings.

Figure 2:
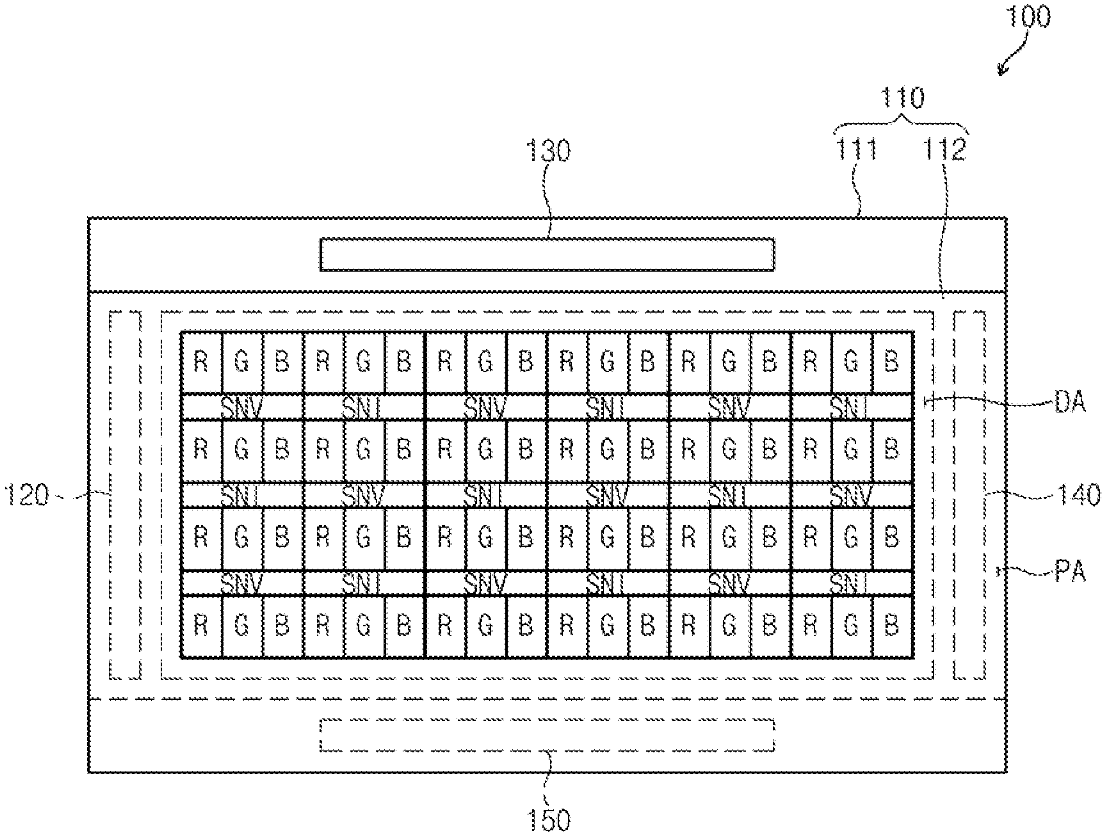
FIG. 2 is a plan view showing a display panel shown in FIG. 1.
Figure 3:
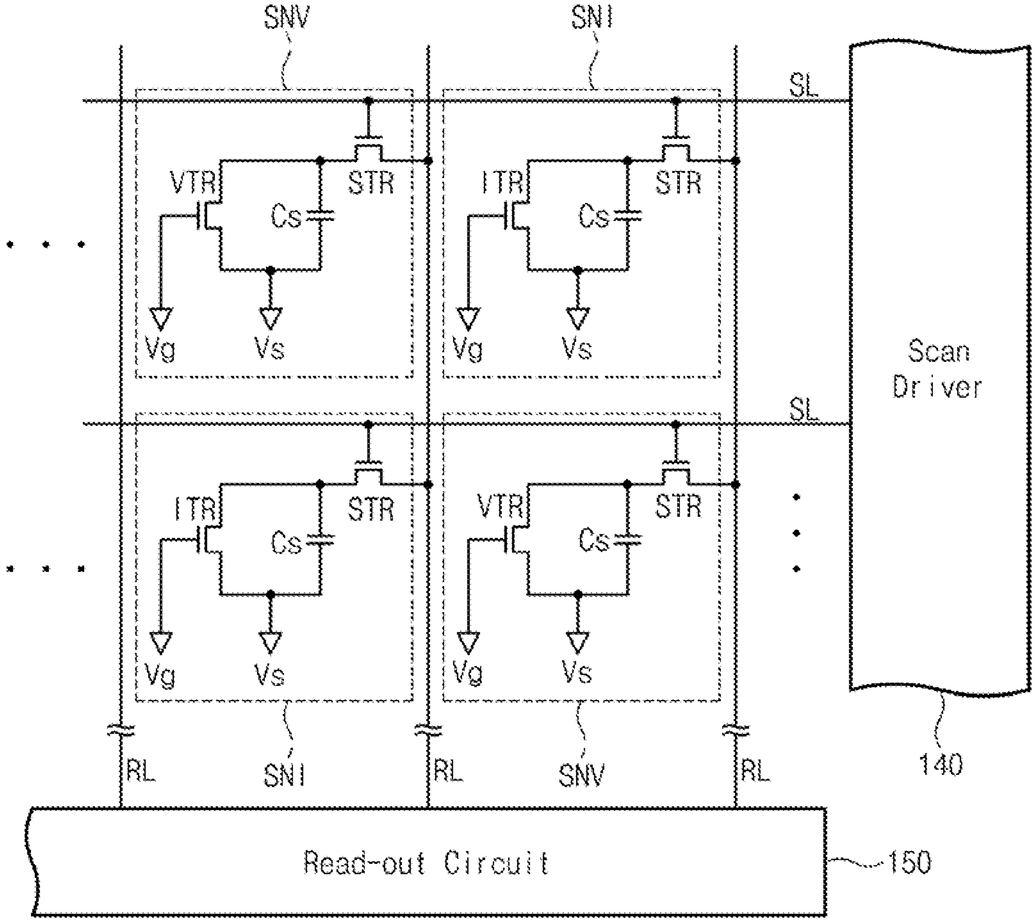
FIG. 3 is a circuit diagram showing sensors shown in FIG. 1.

FIG. 1 is a block diagram showing a display apparatus according to an exemplary first embodiment. FIG. 2 is a plan view showing a display panel shown in FIG. 1. FIG. 3 is a circuit diagram showing sensors shown in FIG. 1.

Referring to FIG. 1, a display apparatus 100 in accordance with the present disclosure includes a display panel 110, a gate lines driving circuit 120, a data lines driving circuit 130, a scan lines driving circuit 140, a read-out lines receiving circuit 150, and a timing controller 160. For sake of brevity, the gate lines driving circuit 120 will also be referred to herein as the gate driver 120. Similarly, the data lines driving circuit 130 will also be referred to herein as the data driver 130, and so on.

The timing controller 160 receives image signals denoted as RGB and a control signal denoted as CS from an outside source that is operatively coupled to the display apparatus 100. The timing controller 160 converts a data format of the received image signals RGB into a data format appropriate to an interface present between the data driver 130 and the timing controller 160 and provides the converted image signals R'G'B' to the data driver 130. (In one embodiment, rather than just R'G'B', the converted image signals may include a fourth component such as a white light component of a corresponding R'G'B'W' output signal.) In addition, the timing controller 160 provides data control signals DCS, such as those including an output start signal, a horizontal start signal, a polarity inversion signal, etc., to the data driver 130.

The timing controller 160 provides gate control signals GCS, such as those including a vertical start signal, a vertical clock signal, a vertical clock bar signal, etc., to the gate driver 120. The timing controller 160 further provides sensor control signals SCS, such as those including a start signal, a first clock signal, a second clock signal, etc., to the scan driver 140. In addition, the timing controller 160 provides read-out control signals RCS, such as those including a sensing clock signal, to the read-out circuit 150.

The gate driver 120 sequentially outputs gate line activating signals G1 to Gn for sequentially activating gate lines G1 to Gn in response to the gate control signals GCS provided from the timing controller 160.

The data driver 130 converts the digital image signals R'G'B' into corresponding analog data voltages D1 to Dm in response to the data control signals DCS provided from the timing controller 160. The data voltages D1 to Dm output from the data driver 130 are applied to corresponding pixels (PX) of the display panel 110 by way of corresponding data lines D1 to Dm.

The scan driver 140 sequentially outputs scan line activating signals S1 to Sn to corresponding scan lines S1 to Sn in response to the sensor control signals SCS received from the timing controller 160. The sensor control signals SCS may include one or more signals synchronized with the gate control signals GCS.

Although not shown in FIG. 1, the display apparatus 100 further includes a backlight unit disposed adjacent (e.g., beneath and/or at edges of) the display panel 100 and structured to provide white or other light to the display panel 100. The backlight unit may include a plurality of visible light sources to emit light in a predetermined visible light range and a plurality of infrared light sources (e.g., IR LEDs) to emit light in a predetermined infrared light range. The visible and/or IR light sources may be flashed to emit their respective wavelength outputs at different times and/or from different subsections of the display area of panel 110.

Referring to FIG. 2, in one embodiment, the display panel 110 includes a first substrate 111, a second substrate 112 spaced apart from and facing the first substrate 111, and a liquid crystal layer (not shown) interposed between the first substrate 111 and the second substrate 112.

The display panel 110 includes a display area DA in which an image is displayed and a non-displaying peripheral area PA surrounding the display area DA. A plurality of pixels (PX) and a plurality of sensors (SNv and SNir) are arranged in the display area DA as shown in one embodiment. For the convenience of explanation, only exemplary ones of the pixels (PX) and sensors (SN) are shown in FIG. 2, but the number of the pixels and the number of the sensors may vary and depend on their specific embodiments.

The pixels include a red pixel R to display a red portion of the image, a green pixel G to display a green portion of the image, and a blue pixel B to display a blue portion of the image. In addition, the sensors include a visible light sensor SNV structured to sense light in a predetermined visible light range of wavelengths and an infrared light sensor SNI structured to sense light in a predetermined infrared light range of wavelengths, where the sensed wavelengths may match or overlap with the backlight provided wavelengths.

The visible and IR sensors, SNV and SNI, may be disposed in inter-pixel areas such as between two pixels that are otherwise adjacent to each other, i.e., in an area in which a black matrix is formed, so as not to reduce an aperture ratio of the visible light image output by the display panel 110. According to FIG. 2, one of a visible light sensor SNV and an infrared light sensor SNI is disposed as an elongated bar adjacent to and corresponding to a repeated group of pixels such the repeating group of the red, green, and blue pixels R, G, and B. However the arrangement of the pixels and the sensors may be changed to be otherwise depending upon embodiments and specific applications they serve.

The gate driver 120 may be disposed in a left portion of the peripheral area PA of the first substrate 111 and may be monolithically integrally provided thereat through a thin film process. The scan driver 140 may be disposed in a right portion of the peripheral area PA of the second substrate 112 and may be monolithically integrally provided thereat through a thin film process. In other words, for one embodiment, the gate driver 120 is monolithically integrated on the TFT substrate (also referred to herein as the lower or first substrate) 111 while the scan driver 140 is monolithically integrated on the common electrode substrate (also referred to herein as the upper or second substrate) 112.

As shown in FIG. 2, the first substrate 111 is operatively (at least in an optical sense) coupled to the second substrate 112 to be partially overlapped at least in the display area (DA) region. In one embodiment, the overlapping is staggered such that one end portion of the first substrate 111 does not face the second substrate 112 and such that one end portion of the second substrate 112 does not face the first substrate 111. Thus, the data driver 130 may be mounted on the exposed end portion of the first substrate 111 in a chip-on-glass (COG) manner, and the read-out circuit 150 may be mounted on an exposed end portion of the second substrate 112 in the COG manner. However, the data driver 130 and the read-out circuit 150 may be mounted in a chip-on-film (COF) manner wherein they are sandwiched between counterfacing portions of the first and second substrates, 111 and 112.

Referring to FIGS. 1 and 2, the display panel 110 includes a plurality of gate lines GL extending in a first direction, a plurality of data lines DL extending in a second direction to insulatively cross with the gate lines GL, and pixels PX disposed in matrix form at corresponding crossings of the gate and data lines. The gate lines GL, the data lines DL, and the pixels PX may be integrally disposed on the first substrate 111.

In the present exemplary embodiment, since the pixels have the same structure and function, for the convenience of explanation, one pixel is shown in block diagram form in FIG. 1.

Although not explicitly shown in the figures, it is to be understood that each pixel PX includes a thin film transistor, a liquid crystal capacitor (formed of a pixel-electrode serving as one plate thereof and a common electrode portion serving as a second plate thereof), and a storage capacitor. The thin film transistor includes a gate electrode connected to a corresponding gate line of the gate lines GL, a source electrode connected to a corresponding data line of the data lines DL, and a drain electrode connected to the corresponding pixel electrode of the pixel and also to a corresponding storage electrode that serves as one plate of the storage capacitor of the pixel (PX).

The gate lines GL are connected to the gate driver 120 and the data lines DL are connected to the data driver 130. The gate lines GL receive gate signals G1 to Gn provided from the gate driver 120 and the data lines DL receive data voltages D1 to Dm provided from the data driver 130.

The thin film transistor in each pixel PX is turned on when an activating gate signal ($V_{gON}$) is applied thereto through the corresponding gate line. At that time, the analog data voltage applied through the corresponding data line is transmitted to the corresponding pixel electrode through the turned-on thin film transistor (TFT). Meanwhile, a common voltage is applied to a common electrode that faces the pixel electrode to form an electric field. The common electrode may be disposed on the second substrate 112.

The electric field that is formed due to the difference of the electric potential difference between the common voltage and the data voltage is formed between the pixel electrode and the common electrode. Polarization and/or other light processing attributes of the interposed liquid crystal material are then selectively varied accordingly and a corresponding portion of a total image is formed.

The display panel 110 further includes a plurality of scan lines SL extending in the first direction (parallel to the gate lines), a plurality of read-out lines RL extending in the second dielectric and thus crossing insulatively with the scan lines SL, and a plurality of sensors SN disposed at corresponding crossing of the scan and read-out lines. The scan lines SL, the read-out lines RL, and the sensors SN may be disposed on the second substrate 112.

In the present exemplary embodiment, since the sensors have substantially similar structures and substantially similar functions, for the convenience of explanation, one sensor has been representatively shown in FIG. 1. Details of the sensors (including differences between IR and visible light sensing ones) will be described with reference to FIG. 3.

The scan lines SL are connected to the scan driver 140 to sequentially receive the scan signals S1 to Sn.

The read-out lines RL are connected to the read-out circuit 150 and each read-out line RL provides a predetermined reference voltage that is repeatedly charged into a corresponding sensor SN from the read-out circuit 150. In one embodiment, the magnitude of recharging current needed to recreate the predetermined reference voltage is indicative of the intensity of sensed light recently sensed by the sensor.

Referring to FIG. 3, each repeated sensors structure SN includes a set of wavelength specific sensing transistors, VTR (visible range) and ITR (infra red range), a set of switching or sensor addressing transistors STR, and a corresponding set of sensing capacitors Cs. For the convenience of explanation, only four sensors have been shown in FIG. 3.

The switching transistor STR includes a first electrode connected to a corresponding scan line of the scan lines SL, a second electrode connected to a corresponding read-out line of the read-out lines RL, and a third electrode connected to the respective sensing capacitor Cs of the corresponding sensing transistors VTR and ITR. When one of the switching transistors STR is selectively turned on, it recharges the corresponding sensing capacitor Cs to a predetermined reference charge level. Thereafter, the sensing capacitor Cs may be discharged by its respective sensing transistor as will now be explained.

The sensing transistors include an infrared light sensitive sensing transistor ITR that senses the light in the infrared light range by becoming more conductive is response thereto and a visible light sensitive sensing transistor VTR that senses the light in the visible light range by becoming more conductive is response thereto. Although not shown in FIG. 3, the infrared light sensing transistor ITR may include a semiconductor layer having a silicon germanium (SiGe) sublayer and the visible light sensing transistor VTR may include a semiconductor layer having an amorphous silicon (a-Si) sublayer. The bandgaps of these sublayers determine the wavelengths to which the respective light sensitive sensing transistors will respond to. As each light sensitive sensing transistors is subjected to light in its response range, it becomes more conductive and therefore discharges its corresponding sensing capacitor Cs accordingly. The current needed to recharge the discharged sensing capacitor Cs back to the reference voltage indicates the intensity of in-range light that the light sensitive sensing transistors was subjected to.

The sensing capacitor Cs includes a first electrode connected to the third electrode of the switching transistor STR and a second electrode applied with a source bias voltage Vs. In the present exemplary embodiment, the source bias voltage Vs may be about −4 volts. In addition, each of the sensing transistors VTR and ITR includes a first electrode applied with a gate bias voltage Vg, a second electrode applied with a source bias voltage Vs, and a third electrode connected to the first electrode of the sensing capacitor Cs. In the present exemplary embodiment, the gate bias voltage Vg may be about −9 volts.

Hereinafter, a method of sensing a light reflected by an external object and incident into the sensors SN and measuring a signal corresponding to intensity of the light sensed by the read-out circuit 150 will be described in more detail.

The read-out circuit 150 applies a predetermined voltage (reference voltage), for example about 1 volts, to the read-out lines RL. When the gate turn on voltage (VgON) is sequentially applied to the respective scan line SL to thus turn on the switching transistor STR, the switching transistor STR outputs the voltage of about 1 volts from the read-out circuit 150 to the sensing capacitor Cs. Thus, the first electrode of the sensing capacitor Cs connected to the switching transistor STR has applied thereto the voltage of about 1 volts and the second electrode of the sensing capacitor Cs has applied thereto the source bias voltage Vs of about −4 volts, so that a voltage of about 5 volts is applied to (charged across) the sensing capacitor Cs.

When additional light incident from the exterior is not applied to the sensing transistors VTR and ITR, the sensing transistors VTR and ITR remain turned off as a result of the magnitude of the gate bias voltage Vg. Thus, the first electrode of the sensing capacitor Cs is maintained at the voltage of about 1 volts. Although the switching transistor STR is turned on in response to a next gate on signal applied to the scan lines SL, a voltage difference does not occur between the first electrode of the sensing capacitor Cs and the read-out circuit 150. As a result, a detectable current does not flow to the read-out circuit 150 through the read-out lines RL.

When additional light from the exterior is incident to the sensing transistors VTR and ITR, the sensing transistors VTR and ITR are turned on accordingly, so that electric charges move from the first electrode of the sensing capacitor Cs through the turned-on sensing transistors VTR and ITR to the second capacitor plates. Accordingly, the voltage of the first electrode of the sensing capacitor Cs is changed.

When the switching transistor STR is next turned on in response to the next gate turn on signal (VgON) being applied to the scan lines SL while the voltage of the first electrode of the sensing capacitor Cs is changed to 0.5 volts, the voltage difference of about 0.5 volts occurs between the first electrode of the sensing capacitor Cs and the read-out circuit 150, and thus detectable electric charges (current) flow through the read-out lines RL. The read-out circuit 150 may include a current-detecting integrator (not shown) to charge the electric charges therein, and the intensity of the light incident into the sensors SN is measured based on a voltage developed by the integrator corresponding to the over-time amount of the electric-charge that has been charged into the respective sensing capacitor Cs as detected by the integrator.

As the intensity of the light incident into the sensing transistors VTR and ITR becomes strong, the voltage of the first electrode of the sensing capacitor Cs is more greatly changed and the voltage difference between the first electrode of the sensing capacitor Cs and the read-out circuit 10 becomes large. Thus, the current flowing through the read-out lines RL during recharge becomes larger. As a result, the read-out circuit 150 may measure light intensity in the corresponding wavelength range and produce a corresponding output voltage having the different level according to the intensity of the light incident into the sensing transistor ITR or VTR.

Responsive to read-out control signals RCS received from the timing controller 160, the read-out circuit 150 periodically resets the integrator so that it can integrate anew and relative to time for new sets of electric charges supplied as sensing currents R1 to Rm passed through the read-out lines RL from the read-out circuit 150 to the discharged ones of the sensing capacitors Cs when recharging them to the predetermined reference voltage (e.g., +1V on the STR connected electrode). Then, before each resetting operation, the read-out circuit 150 sequentially provides to the timing controller 160, voltages (or other representative signals) corresponding to the amounts of the electric charges output by the integrator, i.e., as sensing signals, over the preceding measurement duration and with respect to each of the sensors SN.

The timing controller 160 then converts the received analog voltages (or other representative signals) into digital form and transmits the digitally encoded sensing signals SS to an external device in order to process data representing sensed light points in the visible and IR ranges using the sensing signals SS.

Figure 4:
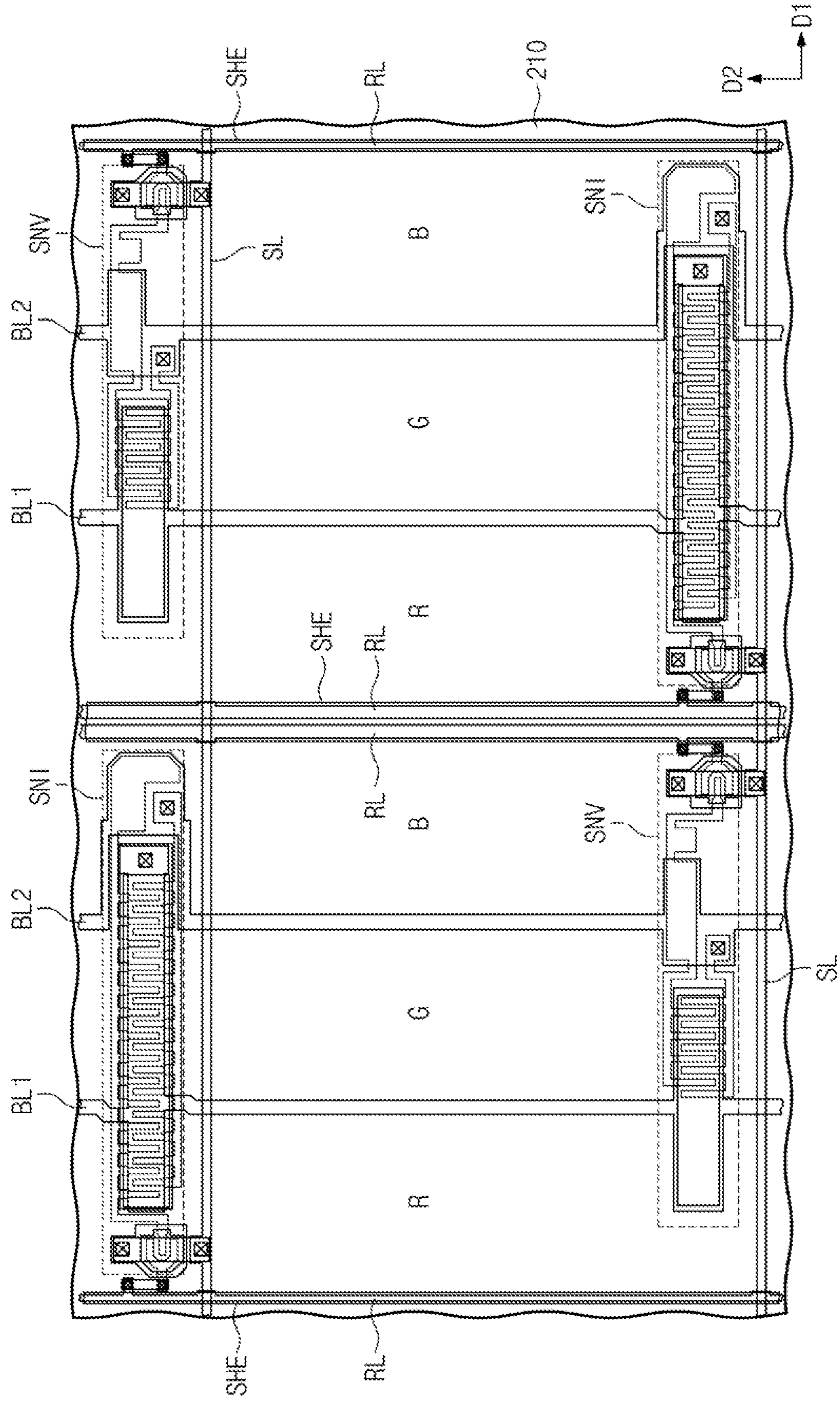
FIG. 4 is a plan view showing a second substrate according to an exemplary embodiment.
Figure 5A:
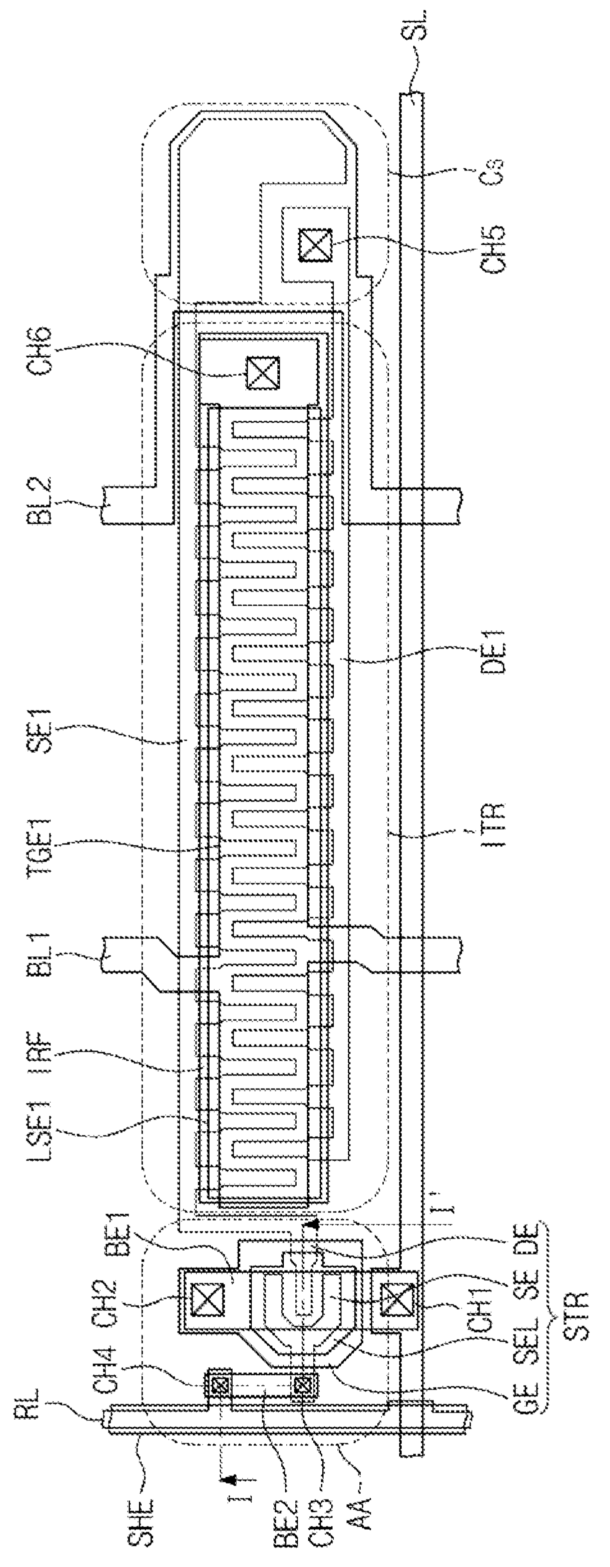
FIG. 5A is an enlarged view showing an infrared light sensor shown in FIG. 4.
Figure 5B:
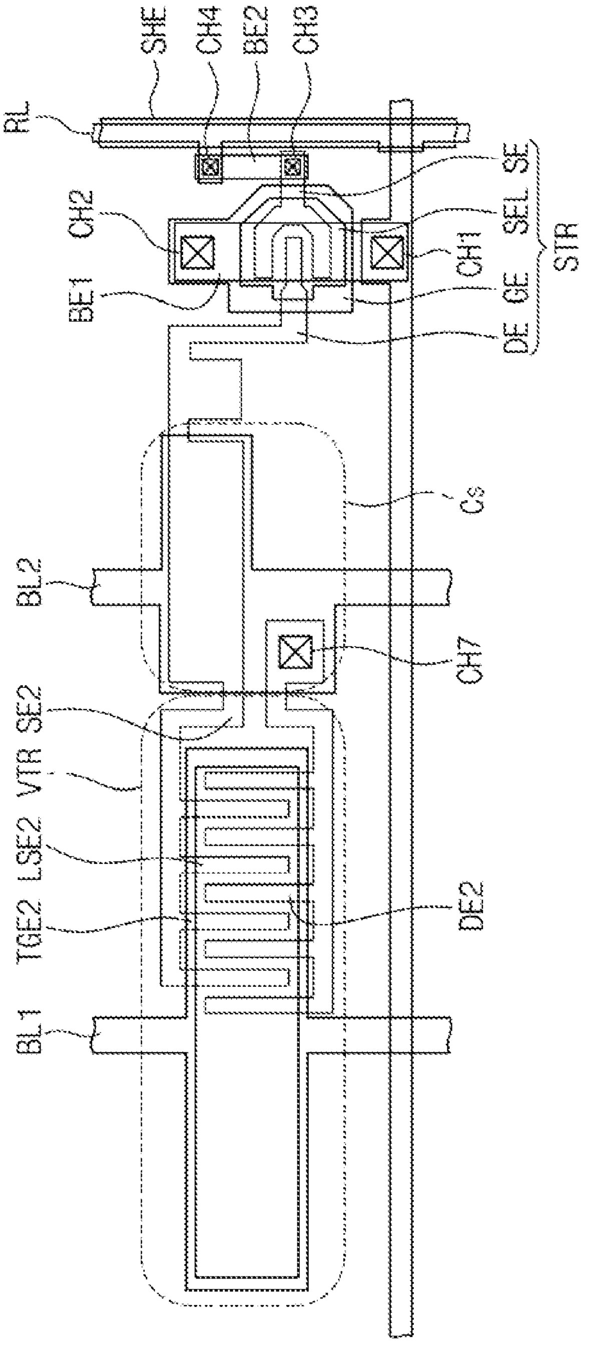
FIG. 5B is an enlarged view showing a visible light sensor shown in FIG. 4.
Figure 6:
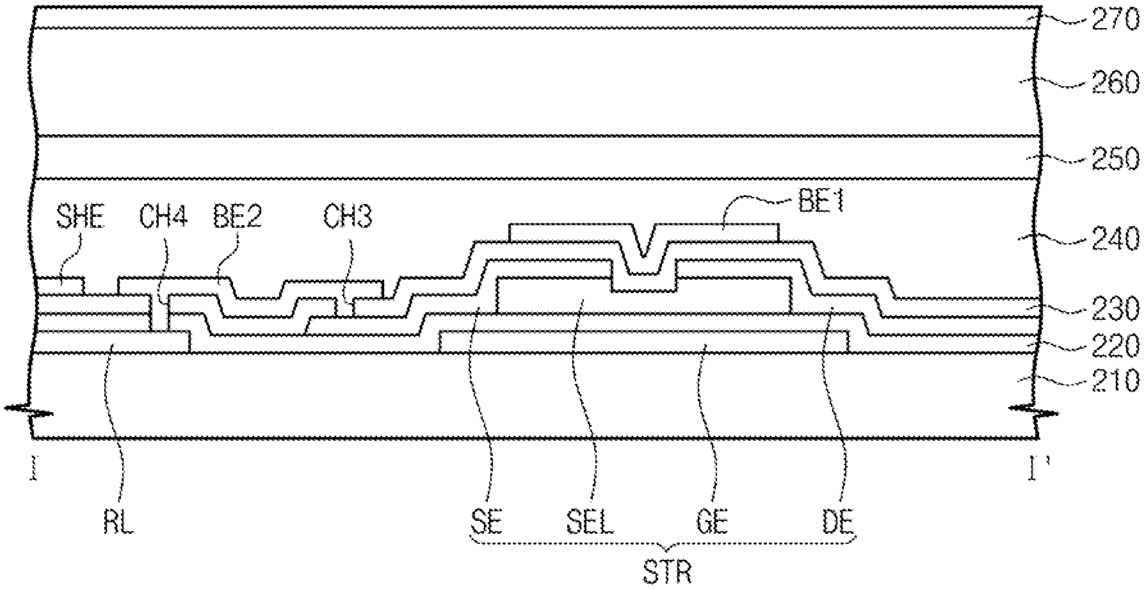
FIG. 6 is a cross-sectional view taken along a line I-I' shown in FIG. 5A.

FIG. 4 is a plan view showing a second substrate according to an exemplary embodiment of the present disclosure. FIG. 5A is an enlarged view showing an infrared light sensor among the two shown in FIG. 4. FIG. 5B is an enlarged view showing a visible light sensor among the two shown in FIG. 4. FIG. 6 is a cross-sectional view taken along a line I-I' of FIG. 5A.

In FIG. 4, two infrared light sensors SNI, two visible light sensors SNV, and areas related to those sensors are shown for the convenience of explanation. The two infrared light sensors SNI are disposed diagonally relative to one another and the two visible light sensors SNV are disposed diagonally relative to one another so as to establish a checkerboard pattern of alternating sensors that are sensitive in the IR band and in the visible band. Referring to the specifics of FIG. 4, the second substrate 112 (the one that includes the common electrode) has the plurality of scan lines SL integrally disposed thereon and extending in the first direction D1. The second substrate 112 also has the plurality of read-out lines RL integrally disposed thereon and extending in the second direction D2 where the latter in this case is substantially perpendicular to the first direction D1. Moreover, the second substrate 112 has a plurality of first bias lines BL1 extending in the second direction D2 for example, in areas above and between the R and G pixel-electrodes and it has a plurality of second bias lines BL2 also extending in the second direction D2 for example, in areas above and between the G and B pixel-electrodes.

As mentioned, when considered either along the horizontal D1 direction or the vertical D2 direction, the infrared light sensors SNI and the visible light sensors SNV are alternately arranged one after the next along the corresponding first and second directions, D1 and D2. Each of the infrared light sensors SNI and the visible light sensors SNV is connected to a corresponding read-out line of the read-out lines RL and a corresponding scan line of the scan lines SL.

The scan lines SL receive the scan signals from the scan driver 140 where, in one embodiment, driver 140 is monolithically integrated on the second substrate 112. In addition, the read-out lines RL provide the voltage charged in the infrared light sensor SNI and the visible light sensor SNV to the read-out circuit 150.

The first bias lines BL1 receive the gate bias voltage Vg from an exterior voltage source and apply the gate bias voltage Vg to the infrared light sensor SNI and the visible light sensor SNV. The second bias lines BL2 receive the source bias voltage Vs from an exterior voltage source and apply the source bias voltage Vs to the infrared light sensor SNI and the visible light sensor SNV.

The second substrate 112 further includes red, green, and blue color filters R, G, and B. The red, green, and blue color filters R, G, and B are arranged in the recited order along the first direction D1 and in one embodiment, they form continuous vertical stripes of respective red, green and blue color in the second direction D2 (see FIG. 2). In the illustrated case, each of the first bias lines BL1 is positioned between the red color filter R and the green color filter G, and each of the second bias lines BL2 is positioned between the green color filter G and the blue color filter B.

Referring to FIGS. 5A and 6, the infrared light sensor SNI includes the infrared light sensing transistor ITR, the switching transistor STR, and the sensing capacitor Cs.

The switching transistor STR includes a gate electrode GE, a semiconductor layer SEL insulatively disposed above the gate electrode GE, a source electrode SE disposed on the semiconductor layer SEL, and a drain electrode DE disposed on the semiconductor layer SEL and spaced apart from the drain electrode DE, where these elements are disposed on a transparent base substrate 210.

The read-out line RL is disposed on the base substrate 210 and a first insulating layer 220 is disposed on the base substrate 210 to cover the read-out line RL and the gate electrode GE. The read-out line RL may be composed of a same conductive material (e.g., metal) as is the gate electrode GE. Although not shown in FIG. 6, the scan line SL is disposed on the first insulating layer 220.

A second insulating layer 230 is disposed on the source and drain electrodes SE and DE and the scan line SL. In addition, a first bridge electrode BE1 and a second bridge electrode BE2 are disposed on the second insulating layer 230.

The first bridge electrode BE1 is connected to the scan line SL through a first contact hole CH1 formed through the second insulating layer 230 and is connected to the gate electrode GE through a second contact hole CH2 formed through the first and second insulating layers 220 and 230. Accordingly, the scan line signal applied to the scan line SL is applied to the gate electrode GE and also applied to the first bridge electrode BE1. In addition, the first bridge electrode BE1 may serve as a top or second gate electrode of the switching transistor STR, thereby improving a function of the switching transistor STR.

The second bridge electrode BE2 is connected to the source electrode SE through a third contact hole CH3 formed through the second insulating layer 230 and is connected to the read-out line RL through a fourth contact hole CH4 formed through the first and second insulating layers 220 and 230. Thus, the voltage signal of the source electrode SE is applied to the read-out line RL through the second bridge electrode BE2.

Accordingly, the switching transistor STR is turned on in response to the scan signal provided through the scan line SL to thereby output the current sensed from the read-out line RL.

The second substrate 112 may further include a shielding electrode SHE insulatively disposed over the read-out line RL, where the insulation is provided by the second insulating layer 230. In detail, the shielding electrode SHE extends along the read-out line RL to prevent an electric field generated by the common electrode from detrimentally affecting signals on the read-out line RL.

A black matrix 240 may be disposed on the first and second bridge electrodes BE1 and BE2 and the shielding electrode SHE. The black matrix 240 absorbs the incident light. A color filter 250 may be disposed on the black matrix 240. The color filter 250 may be the red color filter R, the green color filter G, and the blue color filter B.

A planarized overcoating layer 260 may be disposed on the color filter 250. The overcoating layer 260 compensates a step difference of its lower structure to planarize an upper structure thereof. A common electrode 270 may be disposed on the overcoating layer 260. The common electrode 270 faces a pixel electrode (not shown) disposed on the first substrate 111 to form an electric field through the interposed liquid crystal material (not shown).

The common voltage (Vcom) input to the common electrode 270 may be also applied to the shielding electrode SHE. That is, the shielding electrode SHE may receive the common voltage or a DC voltage signal different from the common voltage.

The infrared light sensing transistor ITR includes a first light sensing layer LSE1 that reacts to the light in the infrared light band, a source electrode SE1 branched from the drain electrode DE of the switching transistor STR and disposed on the first light sensing layer LSE1, a drain electrode DE1 spaced apart from the source electrode SE1 on the first light sensing layer LSE1, and a first top gate electrode TGE1 branched from the first bias line BL1 and disposed on the source and drain electrodes SE1 and DEL. The first top gate electrode TGE1 receives the gate bias voltage Vg through the first bias line BL1.

The drain electrode DE1 of the infrared light sensing transistor ITR is connected to the second bias line BL2 through a fifth contact hole CH5 to receive the source bias voltage Vs.

The sensing capacitor Cs includes an electrode extended from the second bias line BL2 and an electrode extended from the source electrode SE1 of the infrared sensing transistor ITR.

An infrared light filter IRF may be further provided under the first light sensing layer LSE1 of the infrared light sensing transistor ITR to filter the light provided to the first light sensing layer LSE1. The infrared light filter IRF blocks the light of the visible light area and transmits the light of the infrared light area, thereby providing only the light of the infrared light area to the first light sensing layer LSE1.

The infrared light filter IRF may be formed of a semiconductor material such as silicon germanium (SiGe). In this case, the infrared light filter IRF may be connected to the first top gate TGE1 through a sixth contact hole. Since the infrared light filter IRF is connected to the first top gate TGE1, the infrared light filter IRF may be used as an upper and second gate electrode of the infrared light sensing transistor ITR, to thereby improve the function of the infrared light sensing transistor ITR.

Referring to FIG. 5B, the visible light sensor SNV includes the visible light sensing transistor VTR, the switching transistor STR, and the sensing capacitor Cs.

According to FIG. 5B, the sensing capacitor Cs includes an electrode branched from the second bias line BL2 and an electrode branched from the drain electrode DE of the switching transistor STR.

The visible light sensing transistor VTR includes a second light sensing layer LSE2 that reacts to the light of the visible light band, a source electrode SE2 extended from the drain electrode DE of the switching transistor STR and disposed on the second light sensing layer LSE2, a drain electrode DE2 disposed on the second light sensing layer LSE2 and spaced apart from the source electrode SE2, and a second top gate electrode TGE2 branched from the first bias line BL1 and disposed on the source and drain electrodes SE2 and DE2.

The second top gate electrode TGE2 receives the gate bias voltage Vg through the first bias line BL1. The drain electrode DE2 of the visible light sensing transistor VTR is electrically connected to the second bias line BL2 through a seventh contact hole CH7 to receive the source bias voltage Vs.

Figure 7:
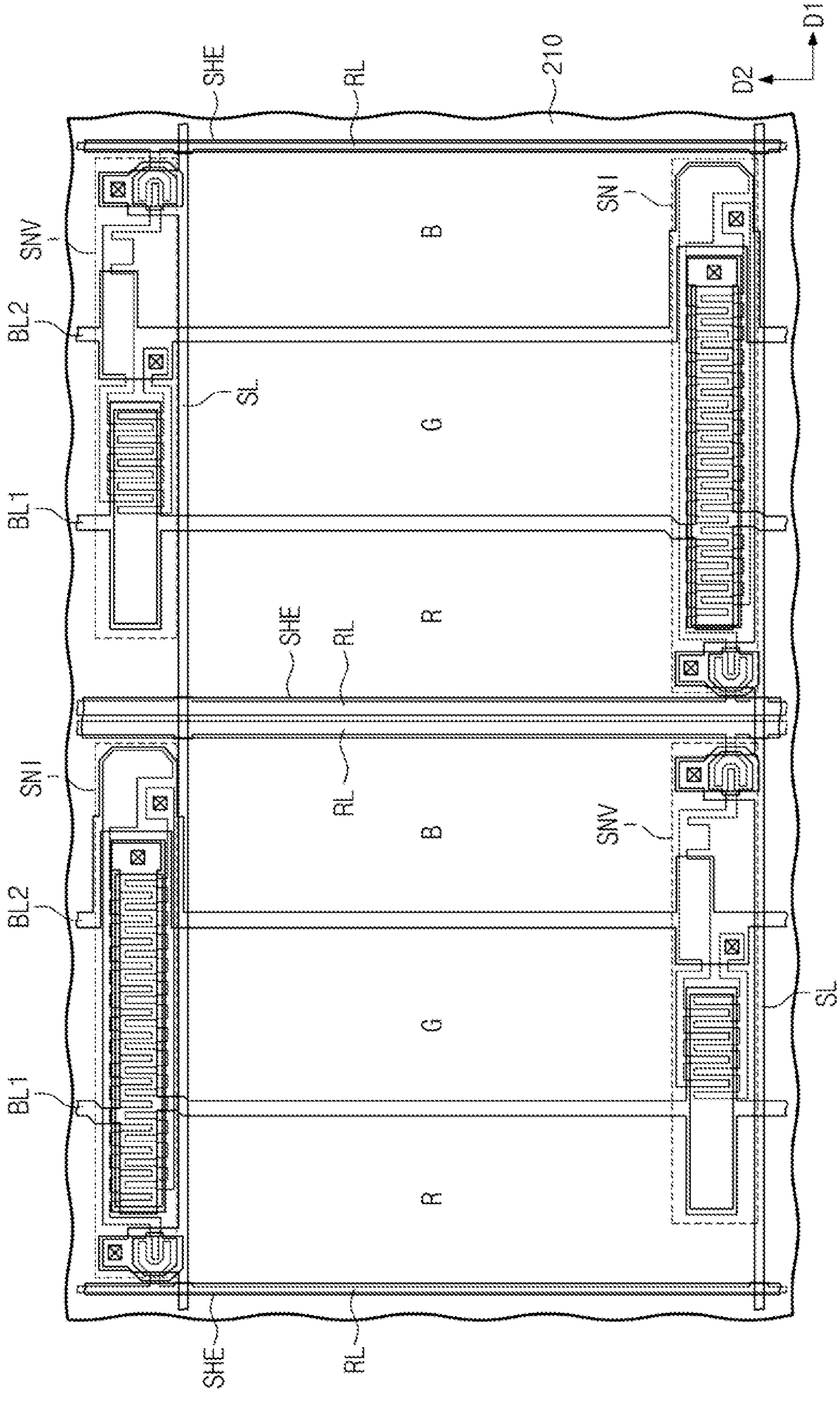
FIG. 7 is a plan view showing a second substrate according to another exemplary embodiment.
Figure 8A:
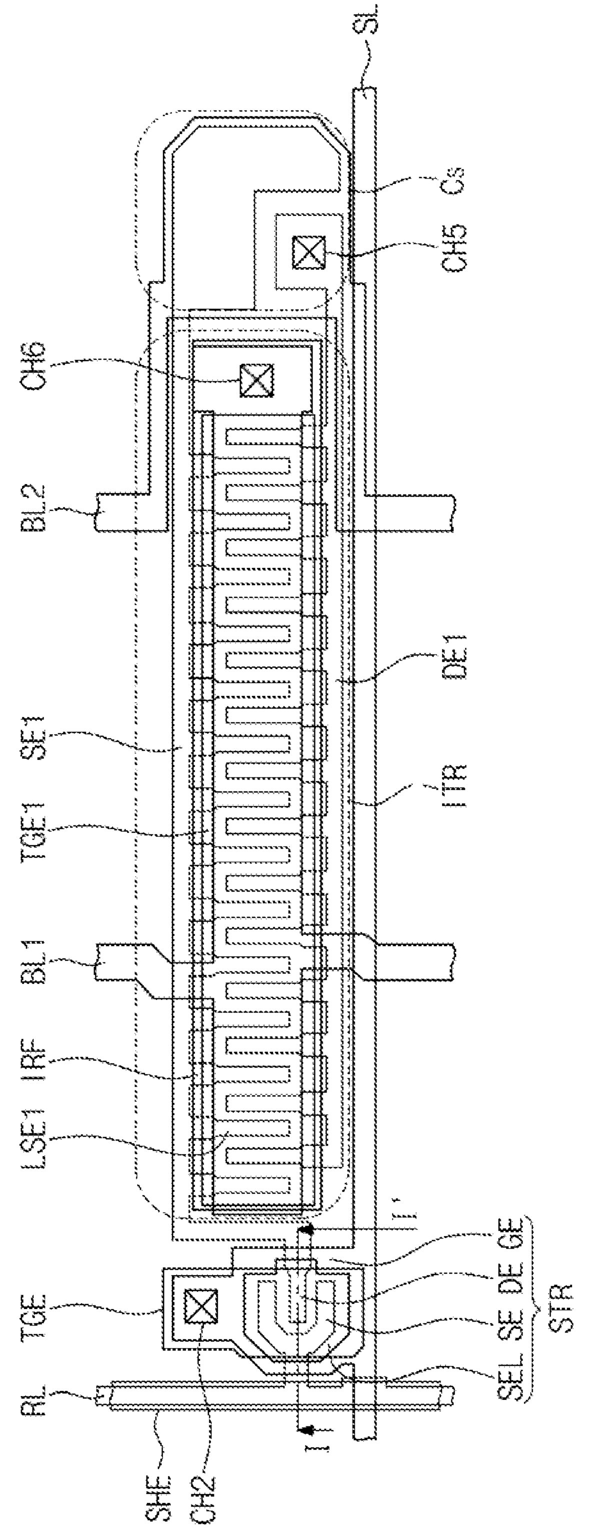
FIG. 8A is an enlarged view showing an infrared light sensor shown in FIG. 7.
Figure 8B:
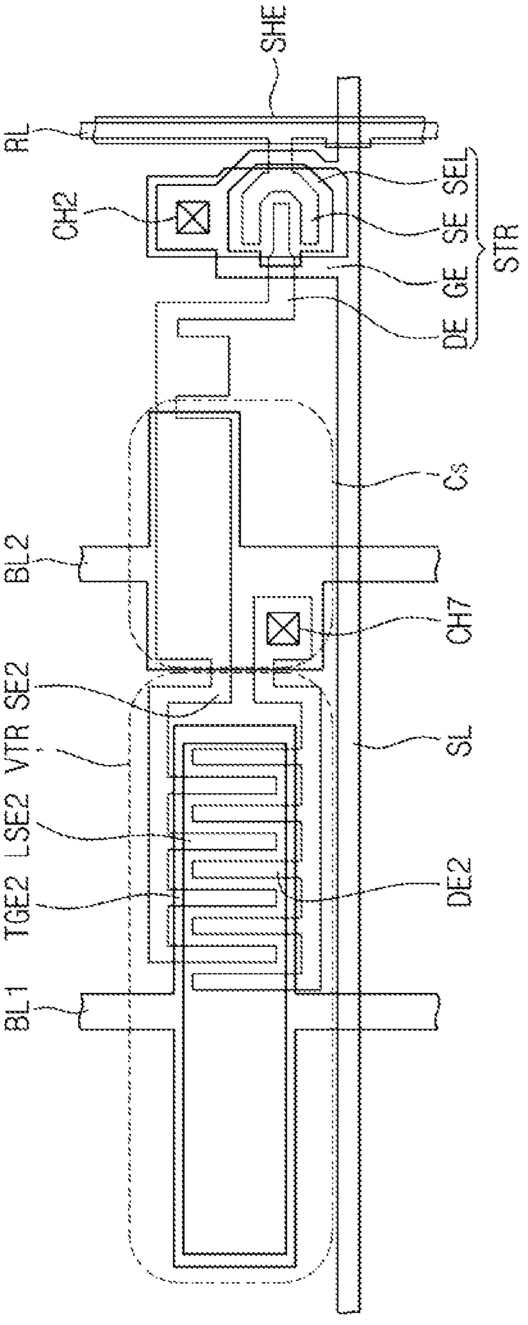
FIG. 8B is an enlarged view showing a visible light sensor shown in FIG. 7.
Figure 9:
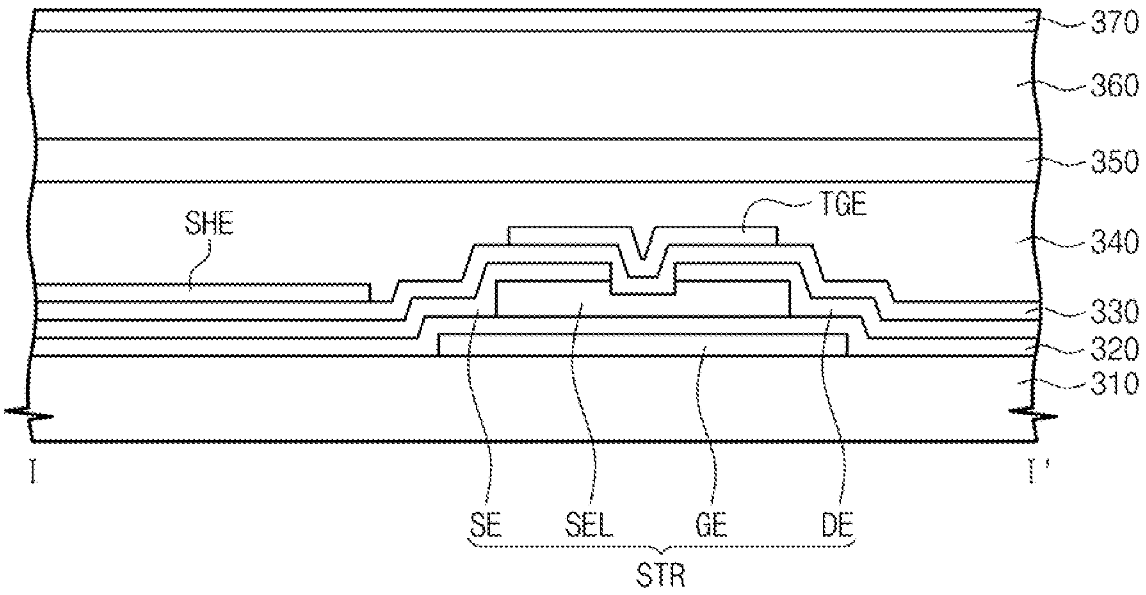
FIG. 9 is a cross-sectional view taken along a line I-I' shown in FIG. 8A.
Figure 10A:
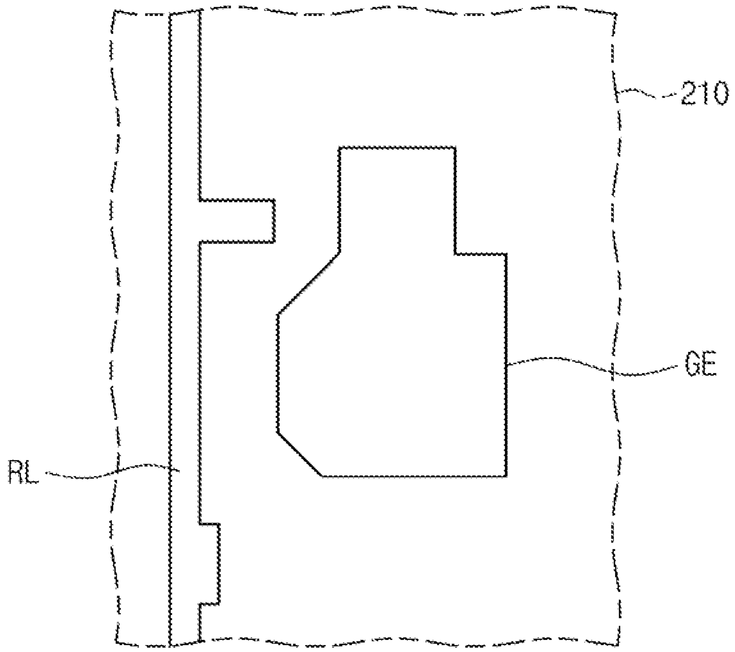
FIGS. 10A to 10E are views showing a method of manufacturing a switching transistor shown in FIG. 5A.
Figure 10B:
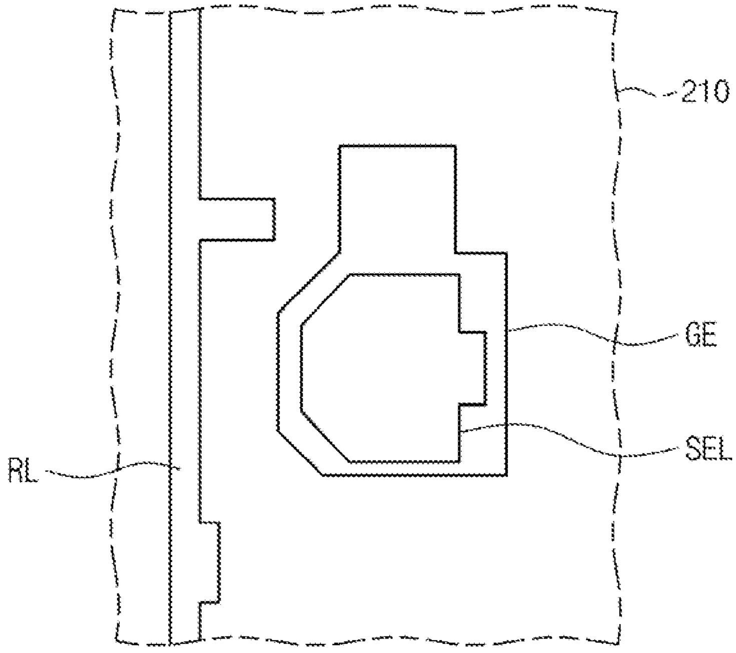
Figure 10C:
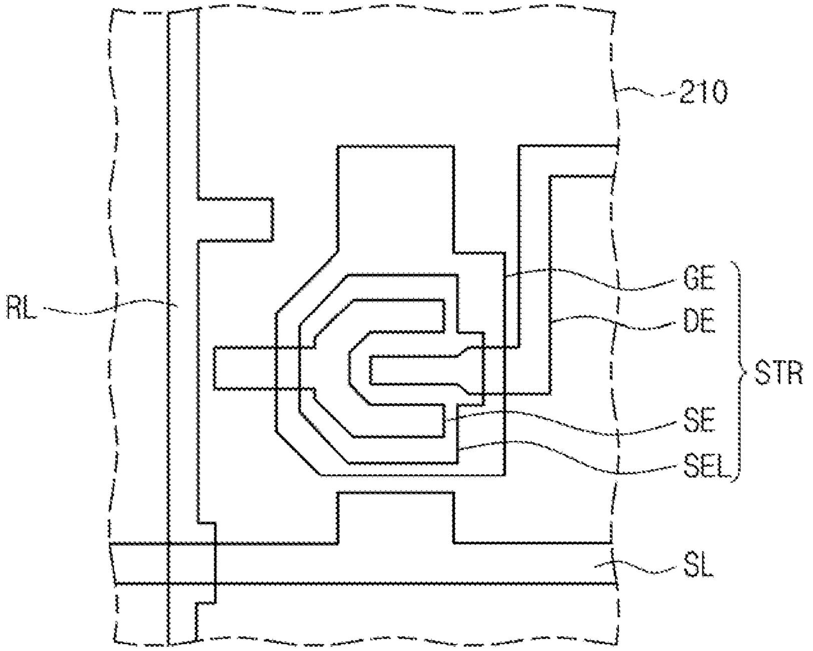
Figure 10D:
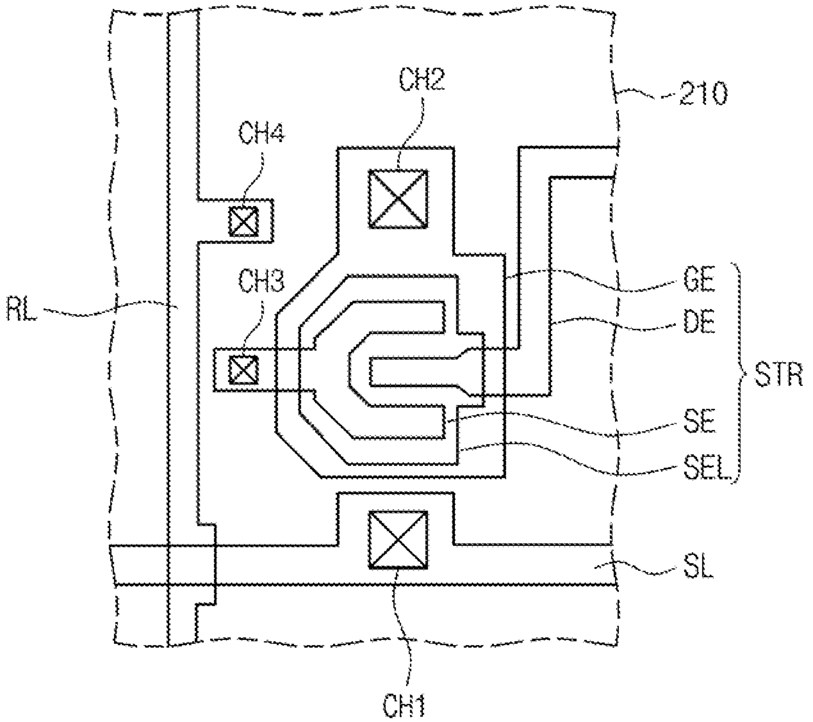
Figure 10E:
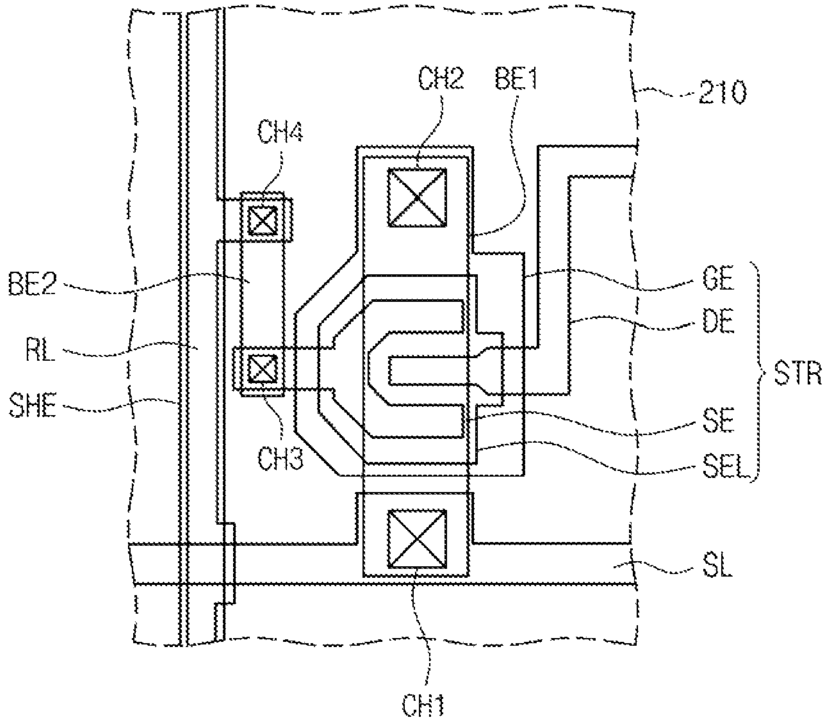

FIG. 7 is a plan view showing a second substrate according to another exemplary embodiment. FIG. 8A is an enlarged view showing an infrared light sensor shown in FIG. 7. FIG. 8B is an enlarged view showing a visible light sensor shown in FIG. 7. FIG. 9 is a cross-sectional view taken along a line I-I' of FIG. 8A.

Referring to FIG. 7, the second substrate 112 includes a plurality of scan lines SL extending in a first direction D1, a plurality of read-out lines RL extending in a second direction D2 substantially perpendicular to the first direction D1, a plurality of first bias lines BL1, and a plurality of second bias lines BL2.

The infrared light sensor SNI and the visible light sensor SNV are alternately arranged in the first and second directions D1 and D2. Each of the infrared light sensor SNI and the visible light sensor SNV is connected to a corresponding read-out line of the read-out lines RL and a corresponding scan line of the scan lines SL.

The scan lines SL receive corresponding scan signals from the scan driver 140. In addition, the read-out lines RL provide the reference voltage that is charged into the infrared light sensor SNI and the visible light sensor SNV to thus determine their degrees of previous discharge, which degrees are detected by the read-out circuit 150.

The first bias lines BL1 receive a gate bias voltage Vg from an exterior to provide the gate bias voltage Vg to the infrared light sensor SNI and the visible light sensor SNV. The second bias lines BL2 receive a source bias voltage Vs from an exterior to provide the source bias voltage Vs to the infrared light sensor SNI and the visible light sensor SNV.

The second substrate 112 further includes red, green, and blue color filters R, G, and B. The red, green, and blue color filters R, G, and B are arranged in the first direction D1 in that order. In this case, each of the first bias lines BL1 is positioned between the red color filter R and the green color filter G, and each of the second bias lines BL2 is positioned between the green color filter G and the blue color filter B.

Referring to FIGS. 8A and 9, the infrared light sensor SNI includes an infrared light sensing transistor ITR, a switching transistor STR, and a sensing capacitor Cs.

The scan lines SL are disposed on a transparent base substrate 310 and a first insulating layer 220 is disposed on the base substrate 310 to cover the scan lines SL. Although not shown in FIG. 9, the read-out lines RL are disposed on the first insulating layer 320.

The switching transistor STR includes a gate electrode GE extending from the scan line SL and disposed on the base substrate 310, a semiconductor layer SEL disposed on the first insulating layer 320 and the gate electrode GE, a source electrode SE extended from the read-out line RL and disposed on the semiconductor layer SEL, and a drain electrode DE spaced apart from the source electrode SE and disposed on the semiconductor layer SEL.

Thus, the switching transistor STR is turned on in response to an activating scan signal provided from the scan line SL to output a predetermined reference voltage supplied from the read-out line RL to the sensing capacitor Cs.

A second insulating layer 330 is disposed on the source and drain electrodes SE and DE and the read-out line RL.

A top gate electrode TGE may be further disposed on the second insulating layer 330. The top gate electrode TGE is connected to the gate electrode GE through a second contact hole CH2 formed through the first and second insulating layers 320 and 330. The top gate electrode TGE may improve the function of the switching transistor STR by causing to operate as a dual gated transistor (one gate adjacent to each of opposed sides of the channel region).

The second substrate 112 further includes a shielding electrode SHE disposed on the second insulating layer 330 to correspond to the read-out line RL. In detail, the shielding electrode SHE extends along the read-out line RL on the second insulating layer 330 to prevent an electric field generated by the common electrode from affecting the read-out line RL.

A black matrix 340 may be disposed on the top gate electrode TGE and the shielding electrode SHE. The black matrix 340 absorbs the incident light. A color filter 350 may be disposed on the black matrix 340.

A planarized overcoating layer 360 may be disposed on the color filter 350. The overcoating layer 360 compensates a step difference of its lower structure to planarize an upper structure thereof. A common electrode 370 may be disposed on the overcoating layer 360. The common electrode 370 faces a pixel electrode (not shown) disposed on the first substrate 111 to form the electric field.

The common voltage input to the common electrode 370 may be input to the shielding electrode SHE. That is, the shielding electrode SHE may receive the common voltage or a voltage different from the common voltage.

Referring to FIG. 8B, the visible light sensor SNV includes a visible light sensing transistor VTR, a switching transistor STR, and a sensing capacitor Cs. The switching transistor STR of the visible light sensor SNV has the same structure and function as the switching transistor STR of the infrared light sensor SNI.

FIGS. 10A to 10E are views showing a method of manufacturing a switching transistor shown in FIG. 5A. FIGS. 10A to 10E show the portion AA shown in FIG. 5A for the convenience of explanation.

The read-out line RL and the gate electrode GE of the switching transistor STR are formed on the base substrate 210. Although not shown in FIGS. 10A to 10E, the first insulating layer 220 is formed on the read-out line RL and the gate electrode GE.

The semiconductor layer SEL is formed on the first insulating layer 220 to correspond to the gate electrode GE. Then, the source electrode SE and the drain electrode DE are formed on the semiconductor layer SEL and the first insulating layer 220 to be spaced apart from each other, and the scan line SL is formed on the first insulating layer 220. The source electrode SE, the drain electrode DE, and the scan line SL may be formed of the same conductive material (e.g., one or more metal layers).

Although not shown in FIGS. 10A to 10E, the second insulating layer 230 is formed on the source electrode SE, the drain electrode DE, and the scan line SL. Then, the first contact hole CH1, the second contact hole CH2, the third contact hole CH3, and the fourth contact hole CH4 are formed through the first insulating layer 220 and/or the second insulating layer 230 to partially expose the scan line SL, the gate electrode GE, the source electrode SE, and the read-out line RL, respectively.

Next, the first bridge electrode BE1 is formed on the second insulating layer 230 to connect through the first contact hole CH1 and through the second contact hole CH2. The second bridge electrode BE2 is similarly formed on the second insulating layer 230 to connect through the third contact hole CH3 and through the fourth contact hole CH4.

The read-out line RL is formed on the base substrate 210 through the same process applied to form the gate electrode GE, and thus the electric field generated by the common electrode may be prevented from affecting the read-out line RL.

Although the exemplary embodiments in accordance with the present disclosure of invention have been described, it is understood that the present teachings should not be limited to these exemplary embodiments but various changes and modifications can be made by one ordinary skilled in the art in light of the foregoing and within the spirit and scope of the present teachings.

What is claimed is:

1. A display panel comprising a first panel substrate, a second panel substrate and a liquid crystal layer interposed between the first panel substrate and the second panel substrate, the first panel substrate having a plurality of pixels disposed on the first panel substrate and structured to enable the display panel to display an image defined by received image signals, where the second panel substrate comprises:

a base substrate;

a read-out line disposed on the base substrate and extending in a first direction;

a first insulating layer disposed on the read-out line;

a scan line extending in a second direction to cross with the read-out line and disposed on the first insulating layer;

a switching device comprising a first electrode connected to the scan line, a second electrode connected to the read-out line, and a third electrode spaced apart from the second electrode; and a light sensor connected to the third electrode and structured to sense an incident light of a predetermined band of wavelengths, wherein the display panel further comprising a display area that displays an image; and a non-displaying area surrounding the display area, wherein the light sensor is arranged in the display area.

2. The display panel of claim 1, and where the second panel substrate further comprises:

a second insulating layer disposed on the second and third electrodes and the scan line;

a first bridge electrode disposed on the second insulating layer; and a second bridge electrode disposed on the second insulating layer to be spaced apart from the first bridge electrode, wherein the first electrode is connected to the scan line through the first bridge electrode and the second electrode is connected to the read-out line through the second bridge electrode.

3. The display panel of claim 2, wherein the first electrode is disposed between the base substrate and the first insulating layer, and the second and third electrodes are disposed between the first insulating layer and the second insulating layer.

4. The display panel of claim 3, wherein the second insulating layer is provided with a first contact hole formed therethrough to expose a portion of the scan line, the first and second insulating layers are provided with a second contact hole formed therethrough to expose a portion of the first electrode, and the bridge electrode connects the first electrode to the scan line through the first and second contact holes.

5. The display panel of claim 3, wherein the second insulating layer is provided with a third contact hole formed therethrough to expose a portion of the second electrode, the first and second insulating layers are provided with a fourth contact hole formed therethrough to expose a portion of the read-out line, and the second bridge electrode connects the second electrode to the read-out line through the third and fourth contact holes.

6. The display panel of claim 3, wherein the switching device further comprises a semiconductor layer disposed between the first and second electrodes and between the first and third electrodes.

7. The display panel of claim 6, wherein at least a portion of the first bridge electrode is overlapped with the semiconductor layer in a plan view to thereby serve as a second gate electrode of a field effect transistor defined by the switching device.

8. The display panel of claim 2, further comprising a shielding electrode disposed on the second insulating layer, spaced apart from the first and second bridge electrodes, and extended along and over the read-out line so as to shield the read-out line.

9. The display panel of claim 8, wherein the shielding electrode is applied with a predetermined voltage.

10. The display panel of claim 8, further comprising a black matrix disposed on the shielding electrode and the first and second electrodes to absorb incident light.

11. The display panel of claim 10, further comprising a common electrode disposed on the black matrix, wherein the shielding electrode is applied with a same signal as is applied to the common electrode.

12. The display panel of claim 1, wherein the first panel substrate comprises a plurality of pixel areas and a non-pixel area disposed between two otherwise adjacent pixel areas, and the switching device and the light sensor are disposed on the second panel substrate in positions corresponding to the non-pixel area when the first and second panel substrates are viewed in a plan view.

13. The display panel of claim 1, wherein the light sensor is provided in a plural number and the light sensors comprise a visible light sensor to sense a light of a predetermined visible light band and an infrared light sensor to sense a light of a predetermined infrared light band.

14. The display panel of claim 13, wherein the visible light sensor and the infrared light sensor are alternately arranged with each other when viewed in a plan view.

15. A display panel comprising a first panel substrate, a second panel substrate partially overlapping the first panel substrate and a liquid crystal layer interposed between the first panel substrate and the second panel substrate, the first panel substrate having a plurality of pixels disposed on the first panel substrate and structured to enable the display panel to display an image defined by received image signals, where the second panel substrate comprises:

a light-passing base substrate;

a scan line disposed on the base substrate and extending in a first direction;

a first insulating layer disposed on the scan line;

a read-out line extending in a second direction to cross with the scan line and disposed on the first insulating layer;

a second insulating layer disposed on the read-out line;

a shielding electrode disposed on the second insulating layer and extending over and along the read-out line so as to shield the read-out line;

a switching device comprising a first electrode branched from the scan line, a second electrode branched from the read-out line, and a third electrode spaced apart from the second electrode; and a light sensor connected to the third electrode and structured to sense an incident light having a predetermined one or more wavelengths, wherein the display panel further comprising a display area that displays an image; and a non-displaying area surrounding the display area, wherein the light sensor is arranged in the display area.

16. The display panel of claim 15, further comprising a common electrode disposed on the shielding electrode, wherein the shielding electrode is connected to receive a same signal as is received by the common electrode.

17. The display panel of claim 15, further comprising a top gate electrode disposed on the second insulating layer such that at least a portion of the top gate electrode is overlapped with the gate electrode when viewed in a plan view.

18. The display panel of claim 17, wherein the first and second insulating layers are provided with a contact hole formed therethrough to expose a portion of the gate electrode, and the top gate electrode is connected to the gate electrode through the contact hole.

19. A method of simultaneously displaying a signal-defined image from a display panel and detecting intensities of incident light of a predetermined one or more wavelengths incident upon the display panel, the method comprising:

integrally providing an array of light controlling pixels disposed as spaced apart rows of pixels extending in a row direction on a first panel substrate, where the first panel substrate is further provided with a plurality of gate lines extending in the row direction and a crossing plurality of data lines;

integrally providing an array of light sensors disposed as spaced apart rows of sensors on a second panel substrate which is configured to alignably overlap at least partially with the first panel substrate and to control image defining light passing out of a display area common to the first and second panel substrates, where the second panel substrate is further provided with a plurality of scan lines extending in the row direction and crossing a plurality of read-out lines;

combining the first panel substrate and the second panel substrate so that the spaced apart rows of pixels are interdigitated with the spaced apart rows of sensors and a liquid crystal layer is interposed between the first panel substrate and the second panel substrate;

integrally providing a gate lines driving circuit on the first panel substrate; and integrally providing a scan lines driving circuit on the second panel substrate, wherein the display panel further comprising a display area that displays an image; and a non-displaying area surrounding the display area, wherein the light sensor is arranged in the display area.

20. The method of claim 19 and further comprising:

providing electric shielding electrodes extending over the read-out lines so to thereby shield sensor sensing signals carried by the read-out lines from being substantially interfered with by other signals used to drive the array of light controlling pixels.

* * * * *